US011497041B2

(12) United States Patent
Shi et al.

(10) Patent No.: US 11,497,041 B2
(45) Date of Patent: Nov. 8, 2022

(54) METHOD AND APPARATUS FOR RESOURCE ALLOCATION IN WIRELESS COMMUNICATION

(71) Applicant: ZTE CORPORATION, Guangdong (CN)

(72) Inventors: Jing Shi, Guangdong (CN); Shuqiang Xia, Guangdong (CN); Xianghui Han, Guangdong (CN); Chunli Liang, Guangdong (CN); Wen Zhang, Guangdong (CN); Min Ren, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 69 days.

(21) Appl. No.: 16/784,034

(22) Filed: Feb. 6, 2020

(65) Prior Publication Data
US 2020/0178274 A1   Jun. 4, 2020

Related U.S. Application Data (63) Continuation of application No. PCT/CN2017/097241, filed on Aug. 11, 2017.

(51) Int. Cl.
*H04W 72/12* (2009.01)
*H04L 1/18* (2006.01)
(Continued)

(52) U.S. Cl.
CPC ....... *H04W 72/1268* (2013.01); *H04L 1/1819* (2013.01); *H04L 5/0055* (2013.01); *H04W 72/0493* (2013.01)

(58) Field of Classification Search
CPC .......... H04W 72/1268; H04W 72/0493; H04L 1/1819; H04L 5/0055
(Continued)

(56) References Cited

U.S. PATENT DOCUMENTS 7,852,883 B2   12/2010   Kwak et al.
9,451,631 B2    9/2016   Lee et al.
(Continued)

FOREIGN PATENT DOCUMENTS

CN   101237313 A    8/2008
CN   101330306 A   12/2008
(Continued)

OTHER PUBLICATIONS

Sharp "5G NR short PUCCH considerations" 3GPP TSG RAN WG1 NR Ad Hoc Meeting, R1-1700730, Spokane, Washington, USA, Jan. 20, 2017, 4 pages.
(Continued)

*Primary Examiner* — Obaidul Huq
(74) *Attorney, Agent, or Firm* — Duane Morris LLP (57) ABSTRACT

Methods and system for transmitting a scheduling request simultaneously with HARQ-ACK messages are disclosed. In one embodiment, a method performed by a first communication node, includes: allocating N resources for transmitting a scheduling request from a second communication node to the first communication node, wherein at least one resource is allocated for transmitting the scheduling request only and also for transmitting a HARQ-ACK message and the scheduling request simultaneously, wherein N is a positive integer.

15 Claims, 4 Drawing Sheets

(51) Int. Cl.
*H04L 5/00* (2006.01)
*H04W 72/04* (2009.01)

(58) Field of Classification Search
USPC ........................................ 370/310, 328, 329
See application file for complete search history.

(56) References Cited

U.S. PATENT DOCUMENTS

| | | | |
|---|---|---|---|
| 2011/0310819 | A1 | 12/2011 | Liao |
| 2012/0113962 | A1 | 5/2012 | Jen |
| 2012/0307773 | A1 | 12/2012 | Tiirola et al. |
| 2013/0003678 | A1 | 1/2013 | Quan |
| 2015/0071264 | A1 | 3/2015 | Yang et al. |
| 2015/0289259 | A1 | 10/2015 | Yang et al. |
| 2018/0310257 | A1* | 10/2018 | Papasakellariou .... H04W 52/50 |
| 2018/0324787 | A1* | 11/2018 | Yin ....................... H04L 1/1861 |
| 2018/0368169 | A1* | 12/2018 | Jung ................. H04W 72/0413 |
| 2018/0368173 | A1* | 12/2018 | Shaheen ........... H04W 72/1289 |
| 2020/0068594 | A1* | 2/2020 | Li ......................... H04L 5/0055 |
| 2020/0136777 | A1* | 4/2020 | He .................... H04W 72/1284 |
| 2020/0205182 | A1* | 6/2020 | Yamamoto ........ H04W 72/0453 |
| 2020/0236670 | A1* | 7/2020 | Xiong .................. H04L 1/1812 |

FOREIGN PATENT DOCUMENTS

| | | |
|---|---|---|
| CN | 101873704 A | 10/2010 |
| CN | 101986591 A | 3/2011 |
| CN | 102045144 A | 5/2011 |
| CN | 102468940 A | 5/2012 |
| CN | 103532658 A | 1/2014 |
| CN | 104468049 A | 3/2015 |
| CN | 106712894 A | 5/2017 |
| EP | 2547058 A2 | 1/2013 |
| KR | 1020130121673 A | 11/2013 |
| RU | 2426236 C2 | 8/2011 |
| WO | 2011140398 A1 | 11/2011 |
| WO | 2019027995 A1 | 2/2019 |

OTHER PUBLICATIONS

Nokia et al:"On the short PUCCH design for small UCI payloads", 3GPP TSG RAN WG1 NR Ad Hoc Meeting, No. 2, R1-1710893, Qingdao, P.R. China; Jun. 26, 2017 (Jun. 26, 2017), 4 pages.

Panasonic:"Discussion on SR for URLLC and multiplexing with HARQ-ACK", 3GPP TSG RAN WG1 NR Ad Hoc Meeting, No. 2, R1-1710942, Qingdao, P.R. China; Jun. 26, 2017 (Jun. 26, 2017), 2 pages.

Huawei, "Discussion on SR for shortened TTI", 3GPP TSG-RAN WG1 Meeting #88, R1-1703070, Feb. 13-17, 2017, Athens, 4 pages.

Qualcomm Europe "Multiplexing of SR and ACK/NAK transmission on PUCCH" 3GPP TSG RAN WG1 #52, R1-080964, Sorrento, Italy, Feb. 11-15, 2008, 3 pages.

* cited by examiner

METHOD AND APPARATUS FOR RESOURCE ALLOCATION IN WIRELESS COMMUNICATION

TECHNICAL FIELD

The disclosure relates generally to wireless communications and, more particularly, to resource allocation for wireless communications.

BACKGROUND

The 5th generation New Radio (5G NR) wireless communication network is the proposed next generation wireless communication network for which telecommunications standards are currently being developed. The 5G NR network will be an end-to-end ecosystem to enable a fully mobile and connected society. The Next Generation Mobile Networks Alliance estimates that 5G NR networks will be rolled out by 2020 to meet business and consumer demands. In addition to providing faster speeds, it is predicted that 5G NR networks also will need to meet new use cases, such as the Internet of Things (internet connected devices), as well as broadcast-like services and lifeline communication in times of natural disaster. Carriers, chipmakers, original equipment manufacturers (OEMS) and out-sourced assembly and test companies (OSATs), have been preparing for this next-generation (5G) wireless standard, as mobile systems and base stations will require new and faster application processors, basebands and RF devices. Although updated standards that define capabilities beyond those defined in the current 4G standards are under consideration, those new capabilities have been grouped under the current ITU-T 4G standards.

To support increasingly growing demands on enhanced mobility bandwidth, higher reliability, lower transmission delay, and mass number of connections, it is desirable to increase the reliability of various data transmissions under the constraint of a range of delay requirements. A simple method is to increase the reliability of each transmission to a same level. To maintain system spectrum efficiency, however, different reliability requirements, i.e., different target Block Error Ratios (BLER), should be applied to initial data transmissions or retransmissions during Hybrid Automatic Repeat Request (HARQ) processes. Reporting Channel Quality Indicator (CQI) index values corresponding to different target levels may be implemented to meet this goal; however, the problem is that the overheads would be high and delay may be too long. Another method is to represent different levels of error by feeding back different levels of negative acknowledgement (NACK) signals for data transmission, where retransmission may choose different rates of transmission to meet different reliability requirements corresponding to different levels of NACK.

To date, however, no research has been conducted regarding allocating different resources for transmission of uplink signals for different levels of NACK. In addition, for Physical Uplink Control Channel (PUCCH) signals based on sequence resources, no research has been conducted regarding how to allocate resources for carrying scheduling requests (SR). Thus, there is a need for a method and system for allocating channel resources efficiently to meet the anticipated demands of the 5G NR wireless communication network.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

According to embodiments of the invention, in a Hybrid Automatic Repeat reQuest (HARQ) process, a base station allocates one resource for a user equipment (UE) to transmit an ACK acknowledgement and two or more resources for the UE to transmit respective levels of NACK acknowledgements. In some embodiments, those resources allocated for transmitting NACK and ACK acknowledgements are also used to simultaneously transmit a scheduling request (SR) that is used by a UE to request resource allocation for uplink data transmissions. As used in HARQ processes, an ACK acknowledgement indicates a successful transmission and a NACK acknowledgement indicates an unsuccessful transmission. Additionally, the respective levels of NACK acknowledgements as used in some embodiments of this disclosure also represent respective levels of channel quality associated with the unsuccessful transmissions. In some embodiments, the respective levels of channel quality represent respective transmission error rates. In another embodiment, the respective levels of channel quality are represented by respective offsets to a channel quality indicator.

In one embodiment, a method performed by a first communication node, includes: allocating N resources for transmitting a scheduling request from a second communication node to the first communication node, wherein at least one resource is allocated for transmitting the scheduling request only and also for transmitting a HARQ-ACK message and the scheduling request simultaneously, wherein N is a positive integer.

In another embodiment, method performed by a second communication node, includes: transmitting a scheduling request from the second communication node to a first communication node using one of N resources allocated by the first communication node, wherein at least one resource is allocated for transmitting the scheduling request only and also for transmitting a HARQ-ACK message and the scheduling request simultaneously, wherein N is a positive integer.

In a further embodiment, a first communication node, includes: at least one processor configured for allocating N resources for transmitting a scheduling request from a second communication node to the first communication node, wherein at least one resource is allocated for transmitting the scheduling request only and also for transmitting a HARQ-ACK message and the scheduling request simultaneously, wherein N is a positive integer.

In yet another embodiment, a second communication node, includes: a transceiver configured for transmitting a scheduling request to a first communication node using one of N resources allocated by the first communication node, wherein at least one resource is allocated for transmitting the scheduling request only and also for transmitting a HARQ-ACK message and the scheduling request simultaneously, wherein N is a positive integer.

BRIEF DESCRIPTION OF THE DRAWINGS

Various exemplary embodiments of the invention are described in detail below with reference to the following Figures. The drawings are provided for purposes of illustration only and merely depict exemplary embodiments of the invention to facilitate the reader's understanding of the invention. Therefore, the drawings should not be considered limiting of the breadth, scope, or applicability of the invention. It should be noted that for clarity and ease of illustration these drawings are not necessarily drawn to scale.

DETAILED DESCRIPTION OF EXEMPLARY EMBODIMENTS

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described and illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

Figure 1:
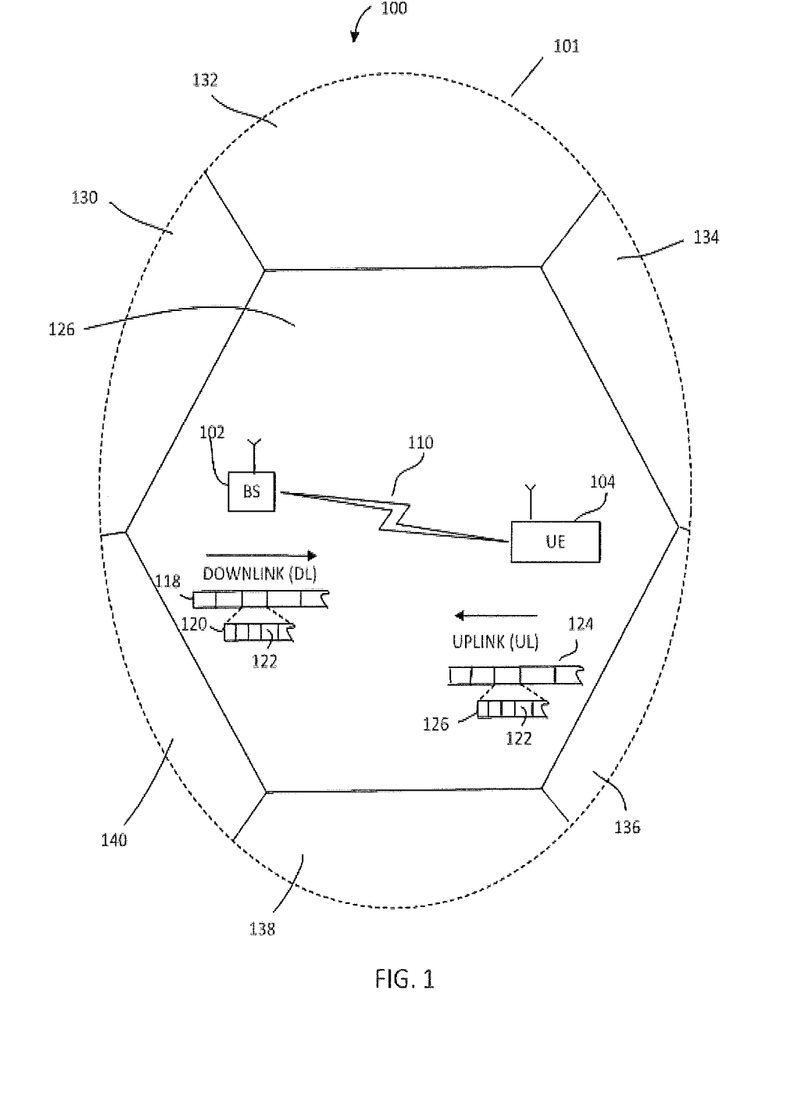
FIG. 1 illustrates an exemplary cellular communication network in which techniques disclosed herein may be implemented, in accordance with an embodiment of the present disclosure.

FIG. 1 illustrates an exemplary wireless communication network 100 in which techniques disclosed herein may be implemented, in accordance with various embodiments of the present disclosure. The exemplary communication network 100 includes a base station (BS) 102 and a user equipment (UE) device 104 that can communicate with each other via a communication link 110 (e.g., a wireless communication channel), and a cluster of notional cells 126, 130, 132, 134, 136, 138 and 140 overlaying a geographical area 101. In FIG. 1, the BS 102 and UE 104 are contained within the geographic boundary of cell 126. Each of the other cells 130, 132, 134, 136, 138 and 140 may include at least one base station operating at its allocated bandwidth to provide adequate radio coverage to its intended users. For example, the base station 102 may operate at an allocated channel transmission bandwidth to provide adequate coverage to the UE 104. The base station 102 and the UE 104 may communicate via a downlink radio frame 118, and an uplink radio frame 124 respectively. Each radio frame 118/124 may be further divided into sub-frames 120/126 which may include data symbols 122/128. In the present disclosure, the base station (BS) 102 and user equipment (UE) 104 are described herein as non-limiting examples of "communication devices," generally, which can practice the methods disclosed herein. Such communication devices may be capable of wireless and/or wired communications, in accordance with various embodiments of the invention.

Figure 2:
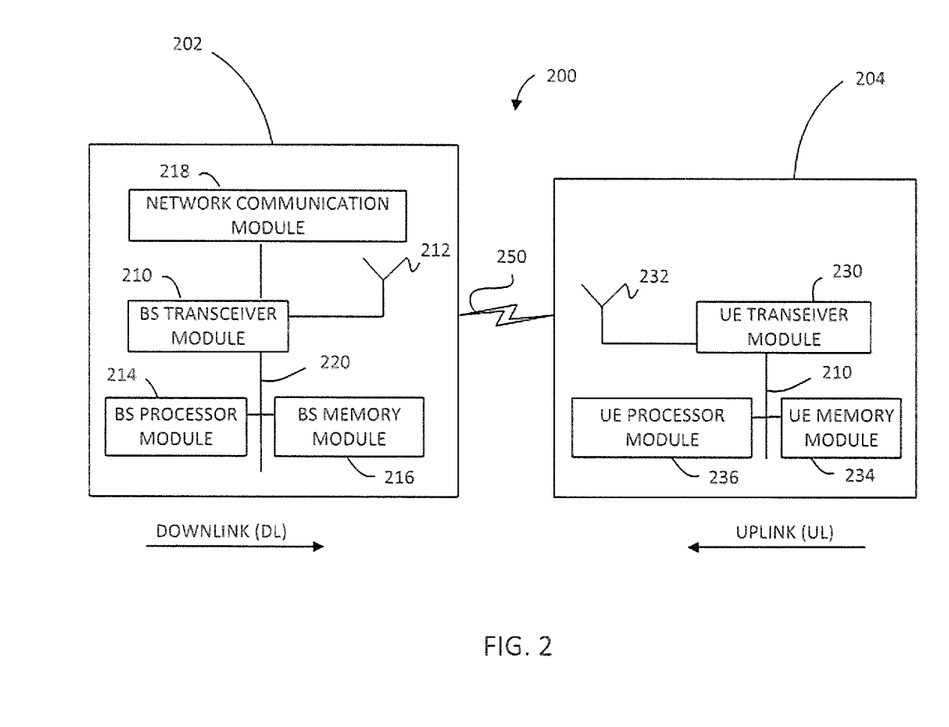
FIG. 2 illustrates block diagrams an exemplary base station and user equipment device, in accordance with some embodiments of the invention.

FIG. 2 illustrates a block diagram of an exemplary wireless communication system 200 for transmitting and receiving wireless communication signals, e.g., OFDM/OFDMA signals, in accordance with some embodiments of the invention. The system 200 may include components and elements configured to support known or conventional operating features that need not be described in detail herein. In one exemplary embodiment, system 200 can be used to transmit and receive data symbols in a wireless communication environment such as the wireless communication environment 100 of FIG. 1, as described above.

System 200 generally includes a base station 202 and a UE 204. The base station 202 includes a BS transceiver module 210, a BS antenna 212, a BS processor module 214, a BS memory module 216, and a network communication module 218, each module being coupled and interconnected with one another as necessary via a data communication bus 220. The UE 204 includes a UE transceiver module 230, a UE antenna 232, a UE memory module 234, and a UE processor module 236, each module being coupled and interconnected with one another as necessary via a date communication bus 240. The BS 202 communicates with the UE 204 via a communication channel 250, which can be any wireless channel or other medium known in the art suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

In accordance with some embodiments, UE transceiver 230 may be referred to herein as an "uplink" transceiver 230 that includes a RF transmitter and receiver circuitry that are each coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes RF transmitter and receiver circuity that are each coupled to the antenna 212. A downlink duplex switch (not shown) may alternatively couple the downlink transmitter or receiver to the downlink antenna 212 in time duplex fashion. The operations of the two transceivers 210 and 230 are coordinated in time such that the uplink receiver is coupled to the uplink antenna 232 for reception of transmissions over the wireless transmission link 250 at the same time that the downlink transmitter is coupled to the downlink antenna 212. Preferably there is close time synchronization with only a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some exemplary embodiments, the UE transceiver 608 and the base station transceiver 602 are configured to support industry standards such as the Long Term Evolution (LTE) and emerging 5G standards, and the like. It is understood, however, that the invention is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 602 and other network components and communication devices configured to communication with the base station 202. For example, network communication module 218 may be configured to support interne or WiMAX traffic.

In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

Referring again to FIG. 1, as discussed above, when the BS 102 is preparing to transmit and receive data from the UE 104, a channel estimation process is typically performed before the BS actually transmits and receives the data from the UE 104. During such a channel estimation process, one or more reference signals are typically transmitted from the BS 102 to the UE 104 via one or more physical channels.

In accordance with some embodiments, the BS 102 may configure the UE 104 with a PUCCH resource that supports multiple levels of NACK, where the number of all levels of multi-level NACKs are equal to N and N is an integer larger than 1. For example, where N=3, the multi-level NACK has three levels, NACK1, NACK2, and NACK3. The following description is for the example where N=3, but the invention is not so limited.

In accordance with various embodiments, each different NACK level can be associated with at least one of the following: a CQI offset value, a CQI index value, a target BLER level, a rate offset value, a rate value, a signal to interference plus noise ratio (SINR) level, and a SINR offset value. For example, if each different NACK level is associated with a predetermined CQI offset value, the UE 104 may correlate a detected SINR value to a needed or desired rate, e.g., a rate associated with the CQI index corresponding to NACK1. The UE may also compute a CQI offset according to a delay requirement of a particular application or communication session. For the example of N=3, CQI offsets of [0, −3, −6] can represent no offset, a moderate offset, and a maximum offset, respectively. The actual CQI is the CQI reported by UE plus the CQI offset corresponding to the various NACK levels.

In accordance with some embodiments, a NACK level may be determined at least partially based on a number of retransmission opportunities remaining from a predetermined number of retransmission tries. For example, if there is only one retransmission opportunity remaining, the CQI index corresponding to the lowest target BLER with the maximum offset is used. In that case, UE 104 will transmit NACK3 on an uplink resource corresponding to NACK3 as identified by the BS 102. If there are two retransmission opportunities remaining, the CQI corresponding to the moderate target BLER with the moderate offset is used. In that case, UE will transmit NACK2 on the resource corresponding to NACK2 as identified by the BS 102. For example, if the CQI index most recently reported by the UE 104 is 12 and the NACK level is a NACK2 level, then the CQI index is updated to 12−3=9, which corresponds to a modulation and coding scheme (MCS) having a lower data rate for the retransmission, which corresponds to a lower BLER for retransmission, when compared to NACK1 MCS and BLER. As another example, if the CQI index most recently reported by the UE 104 is 12 and the NACK level is a NACK3 level, then the CQI index is updated to 12−6=6, which corresponds to a modulation and coding scheme (MCS) having an even lower data rate for the retransmission, which corresponds to an even lower BLER for retransmission, when compared to the NACK2 MCS and BLER.

In some embodiments, the resources for the multi-level NACKs are determined by different sequence resources. The BS 102 may allocate to the UE 104 one sequence to represent an ACK resource and N sequences to provide N different NACK resources for transmitting N different levels of NACK. For N=3, the UE 104 is allocated a total number of 3+1=4 sequence resources for transmitting ACK, NACK1, NACK2 and NACK3 signals.

For the example of sequences generated by a computer (i.e., computer generated sequences (CGS)), in accordance with some embodiments, the base sequences can be $r(n)=e^{j\varphi(n)\pi/4}$, where $0 \leq n \leq M$ and the length of the sequences is 12 (i.e., M=12). $\varphi(n)$ is an element from the set [1, −1, 3, −3]. The ACK, NACK1, NACK2, and NACK3 sequences can be obtained by different cyclic shifts of base sequences by $\alpha$, in accordance with the following equation: $r^{\alpha}(n)=e^{j\alpha n}r(n)$. The sequence is not limited to a CGS, and may also be a ZadoffChu (ZC) sequence, for example, or other sequences. Further, the length of the sequence is not limited to 12, and may be other values, such as 24 or 36.

For the PUCCH based on a sequence, in some embodiments, four PUCCH sequence resources are allocated in the same time domain when allocating PUCCH resources. A same time domain may be a same slot, a same mini-slot, a same symbol, or the same group of symbols, for example.

In some embodiments, the four sequence resources may be in the same frequency domain resource. In other embodiments, the four sequence resources may be in different frequency domain resources. When allocated in different frequency domain resources, the resources represent different HARQ-ACK statuses and may be allocated evenly or unevenly, as described in further detail below.

In one embodiment, the resources are allocated in a same frequency domain resource by allocating the sequence resources in a first physical resource block (PRB). In some embodiments, the resources may be sequence resources derived by cyclic shift the same base sequence by four different units to provide sequence resources for ACK, NACK1, NACK2 and NACK3 transmission.

In another embodiment, the resources are allocated in different frequency domain resources and allocated evenly. For example, two resources (e.g., two sequence resources) are generated by cyclic shifting a base sequence by two different cyclic shifts to represent ACK and NACK1, and allocated to a first PRB. Two more resources (e.g., two sequence resources) are generated by cyclic shifting a base sequence by two different cyclic shifts to represent NACK2 and NACK3, and are allocated to a second PRB. In accordance with various embodiments, respective ones of the sequence resources allocated in different PRBs can be identical to each other, completely different, or partially the same (i.e., having some but not all matching sequence values).

Figure 3A:
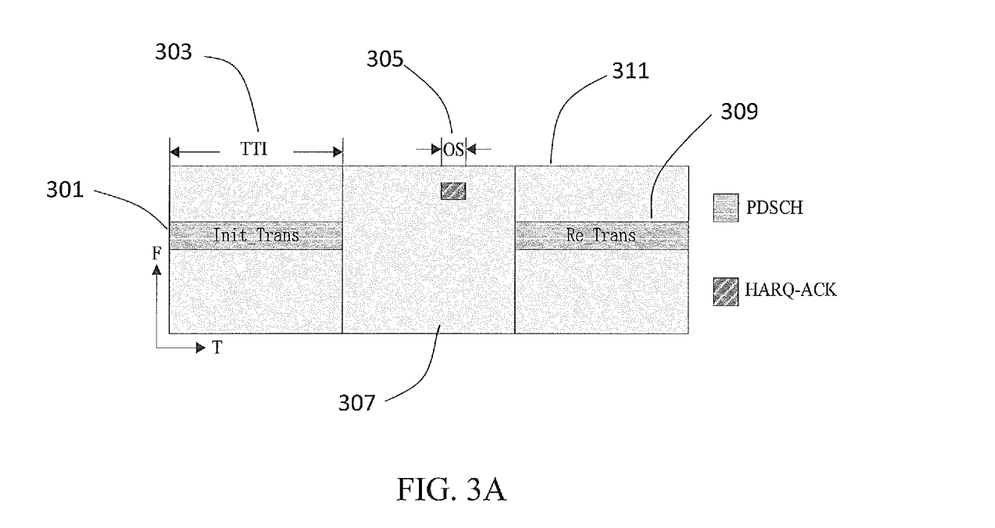
FIGS. 3A and 3B illustrate exemplary scenarios of retransmission based on multi-level NACKs, in accordance with some embodiments.

FIG. 3A illustrates an example of an initial transmission of a signal transmitted by the BS 102 to the UE 104 in a physical downlink shared channel (PDSCH) resource 301 during a first transmission time interval (TTI) 303, in accordance with some embodiments. Depending on whether the initial transmission is successfully received by the UD 104, the UE 104 will send back one of four possible HARQ-ACK messages, e.g., ACK, NACK1, NACK2 and NACK3, each message being allocated to a different resource for transmission of the HARQ-ACK message, in accordance with some embodiments. After receiving the initial transmission, the UE 104 will transmit acknowledgement information (e.g., a HARQ-ACK message), in this case a CQI index offset value corresponding to a NACK1 level, using a resource 305 (e.g., PRB # n1 in a OFDM symbol (OS) 305) allocated for NACK1 during a second TTI 307. Next, in response to the CQI index offset value transmitted in OS 305, the BS 102 will retransmit the same signal in a PDSCH resource 309 during a third TTI 311. Note, the timing for initial transmission and its HARQ-ACK feedback in the embodiment is 1 TTI, which is just an example. In other embodiments, the timing can be other values. This is also true with respect to the timings for HARQ-ACK messages and retransmissions.

As shown in FIG. 3A, each of the above transmissions are performed using resources having a frequency-domain component (vertical access represented by "F") and a time-domain component (horizontal access designated by "T") such as a physical resource block (PRB), for example. As discussed above, a modulation and coding scheme (MCS) and the resources allocated to the retransmission can depend on the level of the NACK. In some embodiments, a NACK1 level corresponds to no CQI offset. Therefore, the MCS and resources allocated to the retransmission will correspond to the CQI index value reported by the UE 104 to BS 102 without any adjustments (i.e., without CQI offset). In some embodiments, the resources corresponding to NACK1 are allocated as one or more OFDM symbols (OS) 305 and, as shown in FIG. 3A, the NACK 1 retransmission resources 309 can be the same (e.g., same frequency and/or time domain resources) as the initial transmission resources 301. In some embodiments, there are 12 resource elements (REs) in one OFDM symbol (OS) contained in one physical resource block (PRB). A sequence having a length of 12 can represent one HARQ-ACK message and is mapped onto the 12 REs in the PRB in one OFDM symbol as configured by the BS 102.

Figure 3B:
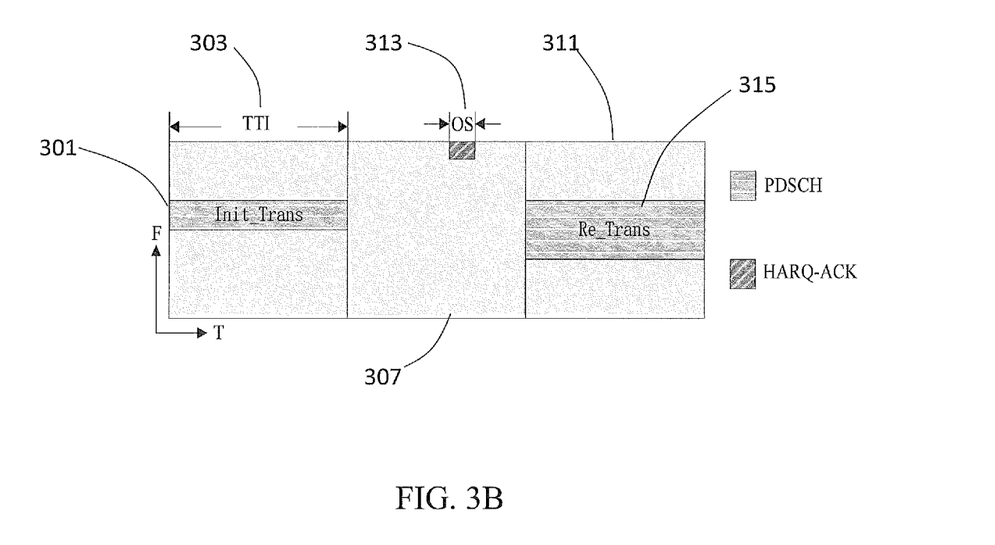

FIG. 3B illustrates a scenario, wherein a NACK3 is sent back on a resource 313 allocated for NACK3 during the second TTI 307. As indicated in FIG. 3B, the resource 313 is different (e.g., different frequency-domain) from the resource 305 allocated for NACK1, as shown in FIG. 3A. As further shown in FIG. 3B, when a NACK3 is received by the BS 102, the BS 102 will apply a corresponding CQI index offset to a CQI index value received by the BS 102 from the UE 104. For example, if the CQI offset for NACK3 is −6, the CQI index reported by the UE 104 will be decreased by 6 and corresponding MCS, BLER and resources will be allocated for retransmission. In accordance with some embodiments, a NACK3 level indicates that retransmission should be made with a more robust set of resources and/or at a lower data rate, corresponding to lower BLER values. In FIG. 3B, the retransmission resource 315 corresponds to a NACK3 level retransmission resource, and is allocated based on the MCS, BLER and other criteria corresponding the CQI index with an offset specified by a NACK3 level NACK. In some embodiments, as indicated in FIG. 3B, the retransmission resource 315 includes additional subcarriers compared to a NACK2 retransmission resource, which includes more subcarriers than a NACK1 retransmission resource. As shown in FIG. 3B, the MCS and the corresponding resources 315 determined for retransmission in accordance with the CQI index value plus the corresponding CQI offset for a NACK3 resource in a second PRB (PRB # n2).

In some embodiments, the resources are allocated in different frequency domain resources and allocated unevenly. For example, one resource (i.e., one sequence resource) is allocated in PRB # n1 contained in one OFDM symbol, and generated, for example, by cyclic shifting based on a base sequence, and represents ACK. Three resources (e.g., sequence resources) are allocated in PRB # n2 contained in the same OFDM symbol, and generated, for example, by cyclic shifting by three cyclic shifts based on a same base sequence, and represent NACK1, NACK2 and NACK3, respectively. The sequences resources allocated in different PRBs can be completely the same, completely different, or partially the same, in accordance with various embodiments.

In some embodiments, multiple levels of NACK (e.g., NACK1, NACK2 and NACK3) are transmitted using different sequence resources during uplink communication from the UE 104 to the BS 102. By doing so, data retransmission will accommodate different levels of reliability requirements and improve system spectrum efficiency while maintaining low delay and high reliability transmission.

In some embodiments, a base station may configure a terminal with a PUCCH resource that supports multi levels of NACK, where the number of all levels of multi-level NACKs are equal to N and N is an integer larger than 1. For example, where N=3, the multi-level NACK has three levels, NACK1, NACK2, and NACK3. The following description is for the example where N=3, but the invention is not so limited.

Different levels of NACK may correspond to different parameter values as discussed above. For example, each different NACK level may be associated with one or more of the following parameter values: a CQI offset, a CQI index, a target BLER level, a rate offset, a rate value, a signal to interference plus noise ratio (SINR) level, and a SINR offset.

The resources for the multi-level NACKs are determined by difference sequence resources. A base station may allocate a UE one sequence to represent an ACK resource and N sequences to represent N NACK resources for N levels of NACK. For N=3, a UE is allocated a total number of 3+1=4 sequences, i.e., one sequence for each of ACK, NACK1, NACK2, and NACK3, respectively.

In some embodiments, for the PUCCH based on a sequence, four PUCCH resources are allocated in different time domains when allocating PUCCH resources for multi-level NACKs. The different time domains may be different slots, different mini-slots, different symbols, or different several symbols. Moreover, the four PUCCH resources may be in different time domain resources, representing different HARQ-ACK messages (e.g., ACK, NACK1, NACK2 or NACK3), whether allocated evenly or unevenly, as described in further detail below.

In one embodiment, the resources are allocated in different time domain resources and allocated evenly. For example, two resources (i.e., two sequence resources) are allocated in a first OFDM Symbol (OS) # n1, and generated, for example, by cyclic shifting by two different units based on a same base sequence, and represent ACK and NACK1, respectively. Two further resources (i.e., two sequence resources) are allocated to a second OS # n2, and generated, for example, by cyclic shifting by two different units the same base sequence, and represent NACK2 and NACK3, respectively. The sequence resources allocated in different OS's can be completely the same, completely different, or partially the same. Additionally, the frequency domain resources (e.g., PRB positions) of the sequence resources allocated in different OS's can be completely the same, completely different, or partially the same.

Figure 4A:
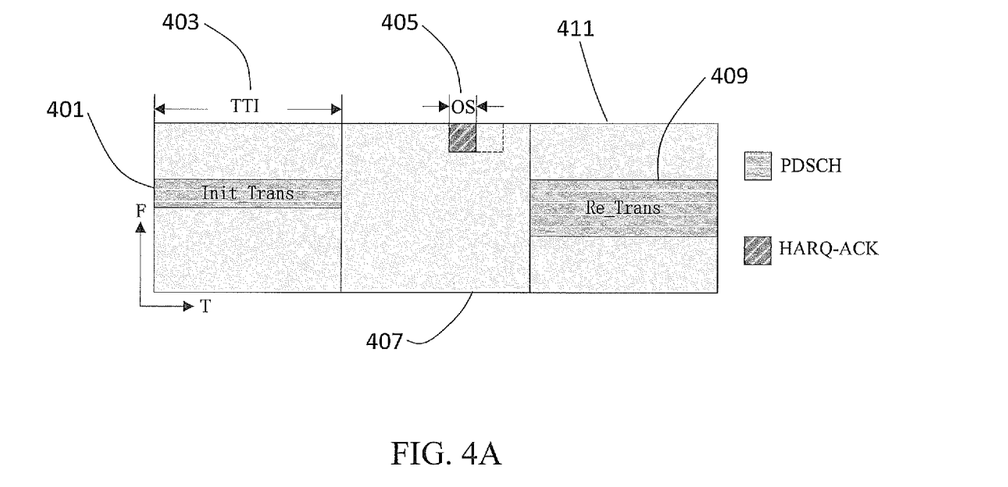
FIGS. 4A and 4B illustrate exemplary scenarios of retransmission based on multi-level NACKs, in accordance with further embodiments.

In some embodiments, the resource for a worst level of NACK (e.g., NACK3) appears at a symbol location that is earlier in time domain. In this way, the worst level of NACK can be transmitted earlier to allow the BS (e.g., an eNB) to retransmit a signal as soon as possible when the retransmission timing is not fixed. As shown in FIG. 4A, a signal is initially transmitted from the BS 102 to the UE 104 using an allocated PDSCH resource 401 as an initial transmission resource 401. Depending on whether the signal is successfully or unsuccessfully received (e.g., decoded successfully or unsuccessfully), the UE 104 will send back either an ACK message if the signal was successfully received, or one of multiple possible NACK messages (e.g., NACK1, NACK2, NACK3) depending the level of errors (e.g., BLER) and/or number of retransmission attempts remaining, for example. In accordance with some embodiments, the greater the level of error and/or smaller the number of retransmission attempts, the higher the NACK level, which corresponds to more robust retransmission schemes and/or retransmission resources. For example, a NACK3 may correspond to a lower data rate (hence lower error rate) and/or more frequency and/or time-domain resources being allocated for retransmission.

Returning to FIG. 4A, in response to receiving the initial transmission or detecting the attempted initial transmission, the UE 104 sends a transmission acknowledgement message (e.g., a HARQ-ACK message) using a resource 405 (e.g., OS 405) allocated to the corresponding type of transmission acknowledgement message. In the example of FIG. 4A, the OS 405 may contain a NACK3 level NACK and correspond to a first OS # n1, which is advanced in the time domain by a predetermined amount, as discussed above. Therefore, a corresponding MCS and the corresponding resources 409 for a NACK3 will be determined for retransmission with a CQI offset corresponding to NACK3. As shown in FIG. 4A, the retransmission parameters (e.g., MCS, BLER, etc.) and resources 409 corresponding to NACK3 may be more robust compared to those of NACK2 and NACK1, respectively.

Figure 4B:
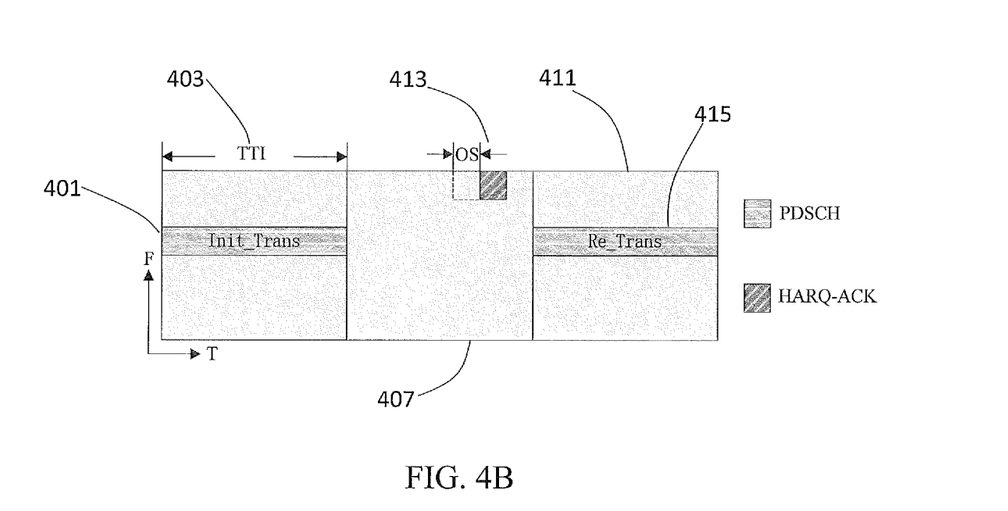

FIG. 4B illustrates an exemplary scenario, wherein a NACK1 is transmitted back by the UE 104 on an allocated uplink resource 413 (e.g., an OS 413) corresponding to NACK1. As shown in FIG. 4B, the resource 413 is delayed in time compared to the resource 405 for NACK3 discussed above, and is therefore handled with less urgency than NACK3 level NACKs. As further shown in FIG. 4B, the MCS and the corresponding resources determined for retransmission without CQI offset is determined according to the NACK1 in OS 413.

In some embodiments, the resources for transmitting acknowledgement information are allocated in different time domain resources and allocated unevenly. For example, one resource (i.e., one sequence resource) is allocated in a first OS # n1, and generated, for example, by cyclic shifting a base sequence to represent NACK3. Three resources (i.e., three sequence resources) are allocated in a second OS # n2, and generated, for example, by cyclic shifting the same base sequence by three different units, to represent ACK, NACK1 and NACK2, respectively. The sequence resources allocated in different OS's can be completely the same, completely different, or partially the same, in accordance with various embodiments. Furthermore, the frequency domain resources (e.g., PRB positions) of the sequence resources allocated in different OS's can be completely the same, completely different, or partially the same, in accordance with various embodiments.

The uplink information transmission methods discussed above, in accordance with some embodiments, may implement transmitting multi-level NACK on different sequence resources, where a worse level NACK may be transmitted earlier. By doing so, data retransmission will accommodate different levels of reliability requirements and improve system spectrum efficiency while maintaining low delay and high reliability transmission.

In some embodiments, base station may configure a terminal with a PUCCH resource that supports multi levels of NACK, where the number of all levels of multi-level NACKs are equal to N and N is an integer larger than 1. For example, where N=3, the multi-level NACK has three levels, NACK1, NACK2, and NACK3. The following description is for the example where N=3, but the invention is not so limited.

In some embodiments, each level of a multi-level NACK can be associated with one or more of the following parameters: a CQI offset, a CQI index, a target BLER level, a rate offset, a rate value, a signal to interference plus noise ratio (SINR) level, and a SINR offset.

The resources for the multi-level NACKs are determined by difference sequence resources, in accordance with some embodiments. A base station may allocate a UE one sequence to represent an ACK resource and N sequences to represent N NACK resources for N levels of NACK. For N=3, a UE is allocated a total number of 3+1=4 sequences, i.e., ACK, NACK1, NACK2, and NACK3.

In one embodiment, for PUCCH signals based on a DeModulation Reference Signal (DMRS), when allocating PUCCH resources, two PUCCH resources are allocated in the same time domain. A same time domain may be a same slot, a same mini-slot, a same symbol, or a same set of multiple symbols. Moreover, the two resources may be in the same frequency domain resource or different frequency domain resources, in accordance with various embodiments. When allocated in different frequency domain resources, the resources represent different HARQ-ACK statuses (e.g., ACK, NACK1, NACK2 or NACK3), allocated evenly, as described in further detail below.

In one embodiment, the resources are allocated in the same frequency domain resource by allocating two resources in PRB # n1, e.g., two sequence resources generated by cyclic shifting based on a same base sequence by 2 different units, where one of the sequences is multiplied by a BPSK modulated symbol and represents ACK and NACK1, and the other sequence is also multiplied by a BPSK modulated symbol and represents NACK2 and NACK3.

In another embodiment, the resources are allocated in different frequency domain resources and allocated evenly. For example, one resource (i.e., one sequence resource) is allocated in PRB # n1, and generated, for example, by cyclic shifting a base sequence, where the sequence is multiplied by a BPSK modulated symbol and represents ACK and NACK1. One resource (i.e., one sequence resource) is allocated in PRB # n2, and generated, for example, by cyclic shifting a base sequence, where the sequence is multiplied by a BPSK modulated symbol and represents NACK2 and NACK3. The sequence resources allocated in different PRBs can be completely the same, completely different, or partially the same. Referring again to FIG. 3A, an MCS and the corresponding resources determined for retransmission without CQI offset is determined according to the NACK1 in PRB # n1, as discussed above. As shown in FIG. 3B, an MCS and the corresponding resources determined for retransmission with a CQI offset is determined according to the NACK3, for example, in PRB # n2. A similar scenario to that illustrated in FIG. 3B can be depicted for retransmission with a CQI offset determined according to a NACK2 HARQ-ACK message transmitted by the UE 104 to the BS 102, for example.

In some embodiments, for PUCCH signals based on a DeModulation Reference Signal (DMRS), when allocating PUCCH resources, one PUCCH resource is allocated in the same time domain. A same time domain may be a same slot, a same mini-slot, a same symbol, or same set of multiple symbols. One resource (i.e., one sequence resource) is allocated in PRB # n1, and generated, for example, by cyclic shifting a base sequence, where the sequence is multiplied by a QPSK modulated symbol and represents ACK, NACK1, NACK2, and NACK3, respectively.

In one embodiment, for the PUCCH based on a sequence, two PUCCH resources are allocated in different time domains when allocating PUCCH resources. The different time domains may be different slots, different mini-slots, different symbols, or different group symbols. Moreover, the two PUCCH resources may be in different time domain resources, representing different HARQ-ACK statuses and allocated evenly, as described in further detail below.

In one embodiment, the resources are allocated in different time domain resources and allocated evenly. For example, one resource (i.e., one sequence resource) is allocated in OFDM Symbol (OS) # n1, and generated, for example, by cyclic shifting a base sequence, where the sequence is multiplied by a BPSK modulated symbol and represents ACK and NACK1. Another resource (i.e., one sequence resource) is allocated in OS # n2, and generated, for example, by cyclic shifting a base sequence, where the sequence is multiplied by a BPSK modulated symbol and represents NACK2 and NACK3. The sequence resources allocated in different OS's can be completely the same, completely different, or partially the same, in accordance with various embodiments. The frequency domain resources (e.g., PRB positions) of the sequence resources allocated in different OS's can be completely the same, completely different, or partially the same, in accordance with various embodiments. Preferably, the resource for a worse level of NACK (e.g., NACK3) appears at a symbol location that is earlier in time domain, as shown in FIG. 4A, for example. Referring again to FIG. 4A, in the above described scenarios, when the HARQ-ACK message is a NACK3, an MCS and the corresponding resources determined for retransmission with CQI offset is determined according to the NACK3 in OS # n1, as shown in FIG. 4A. Similarly, as shown in FIG. 4B, when the HARQ-ACK message is a NACK3, an MCS and the corresponding resources determined for retransmission without CQI offset is determined according to the NACK1 in OS # n2.

As discussed above, in various embodiments, uplink information transmission methods may implement transmission of multi-level NACKs on different resources. By doing so, data retransmission will accommodate different levels of reliability requirements and improve system spectrum efficiency while maintaining low delay and high reliability transmission.

In some embodiments, a base station may configure a terminal with a PUCCH resource configured to carry a scheduling request (SR), where a plurality of resources (e.g., 4) may be allocated for carrying the SR. A partial status saving can be supported by transmitting the SR with HARQ-ACK message simultaneously, in accordance with various embodiments. In some embodiments, the resources can be determined by different sequences within the same frequency domain resource. As discussed above, in some embodiments, the sequence resources can be derived by different cyclic shifting based on a base sequence.

In one embodiment, a base station configures one resource as an SR resource, which can be used when an SR is transmitted and a HARQ-ACK message is not transmitted. In some embodiments, when the SR and the HARQ-ACK need to be transmitted simultaneously but the simultaneous transmission is not supported, only the HARQ-ACK information is transmitted and the SR transmission is abandoned. When the SR and the HARQ-ACK need to be transmitted simultaneously and simultaneous transmission is supported by the UE, for example, transmission is performed within the configured HARQ-ACK and SR resources, where different meanings are represented by different resources. When the HARQ-ACK message is only 1 bit, for example, two resources are allocated for HARQ-ACK to represent ACK and NACK, respectively. Here, with the SR resource, there are three resources in total, by which the information of simultaneous transmission is represented, as shown in Table 1 below. Here, the three resources represent transmitting ACK only, transmitting NACK only, and transmitting ACK and SR simultaneously, respectively. When transmitting simultaneously, SR has only one resource and may only represent one status. Since the probability of ACK is higher, the SR resource may be used to represent ACK. When transmitting NACK and SR simultaneously, the resource for NACK is still used, meaning SR is dropped (e.g., with 10% of probability since probability of a NACK is 10%). Then the UE will transmit in a next available transmission period. Alternatively, when NACK and SR are transmitted simultaneously, both NACK resource and SR resource are used for transmission (i.e., UE sends two sequences simultaneously).

TABLE 1

| | ACK/NACK only | | ACK/NACK + SR | |
|---|---|---|---|---|
| SR only | ACK | NACK | ACK + SR | NACK + SR |
| SR | A | N | SR | N (equivalent to SR being dropped) or N + SR |

Alternatively, as shown in Table 2 below, when NACK and SR are transmitted simultaneously, SR has only one resource and represent only one status. Thus, to avoid missing a PDCCH detection that leads to inconsistent understanding between the base station and UE, the SR resource may be used to represent NACK. When ACK and SR are transmitted simultaneously, the ACK resource is used. In this scenario, SR is deemed to be dropped (with 90% of probability), and the UE will transmit in a next available transmission period.

TABLE 2

| | ACK/NACK only | | ACK/NACK + SR | |
|---|---|---|---|---|
| SR only | ACK | NACK | ACK + SR | NACK + SR |
| SR1 | A | N | A (corresponding to SR being dropped) or A + SR | SR1 |

In some embodiments, a base station can configures two resources as an SR resource. When a SR is transmitted and a HARQ-ACK message is not, one of the two resources is used to transmit SR, where the two resources either correspond to different traffic types, respectively, e.g., eMBB and URLLC traffic, or correspond to different lengths of TTI, e.g., sTTI and TTI. When the SR and the HARQ-ACK need to be transmitted simultaneously but the simultaneous transmission is not supported, only the HARQ-ACK information is transmitted and the SR transmission is abandoned. When the SR and the HARQ-ACK need to be transmitted simultaneously and the simultaneous transmission is supported, transmission is performed within the configured HARQ-ACK and SR resources, where different meanings are represented. When the HARQ-ACK message is 1 bit, two resources are allocated for HARQ-ACK to represent ACK and NACK, respectively. In this case, there are four resources in total, representing transmitting ACK only, transmitting NACK only, transmitting ACK and SR simultaneously, and transmitting NACK and SR simultaneously, respectively. As shown in Table 3 below, the same resource is used when the SR is transmitted using one of the two resources and when NACK and SR are transmitted simultaneously.

TABLE 3

| | ACK/NACK only | | ACK/NACK + SR | |
|---|---|---|---|---|
| SR only | ACK | NACK | ACK + SR | NACK + SR |
| SR_2 | A | N | SR_1 | SR_2 |

In some embodiments, the HARQ-ACK message can be 2 bits, and four resources are allocated for the HARQ-ACK messages to represent {ACK, ACK}, {NACK, ACK}, {ACK, NACK}, and {NACK, NACK}, respectively. Here, with the SR resource, there are six resources in total, representing transmitting {ACK, ACK} only, transmitting {NACK, ACK} only, transmitting {ACK, NACK} only, transmitting {NACK, NACK}, transmitting {ACK, ACK} and SR simultaneously, transmitting {NACK, ACK} and SR simultaneously, as shown in Table 4 below. Thus, it is about 10% probability that the current SR will be dropped; however, this will not lead to unnecessary retransmission of transport block.

TABLE 4

| | ACK/NACK only | | | | ACK/NACK + SR | | | |
|---|---|---|---|---|---|---|---|---|
| SR only | 11 | 01 | 10 | 00 | 11 + SR | 01 + SR | 10 + SR | 00 + SR |
| SR_1 | AA | NA | AN | NN | SR_1 | SR_2 | AN | NN |

In some embodiments, to avoid missing a PDCCH detection that leads to an inconsistent understanding between the base station and UE, with the SR resource, there are six resources in total represent transmitting {ACK,ACK} only, transmitting {NACK,ACK} only, transmitting {ACK, NACK} only, transmitting {NACK,NACK} only, transmitting {NACK,NACK} and SR simultaneously, and transmitting {NACK,ACK} and SR simultaneously, as shown in Table 5 below.

TABLE 5

| | ACK/NACK only | | | | ACK/NACK + SR | | | |
|---|---|---|---|---|---|---|---|---|
| SR only | 11 | 01 | 10 | 00 | 11 + SR | 01 + SR | 10 + SR | 00 + SR |
| SR_1 | AA | NA | AN | NN | AA | SR_2 | AN | SR_1 |

In accordance with some embodiments, another method is to use 2 bits and the simultaneous transmission of ACK/NACK and SR is implemented in a bundling way, as shown in Table 6 below. Two SR resources may be allocated for "SR only" transmission and may differentiate different traffic types; however, when transmitted simultaneously with ACK/NACK, different traffic types may not be differentiated.

TABLE 6

| SR only for eMBB | SR only for URLLC | ACK/NACK only | | ACK/NACK + SR | |
|---|---|---|---|---|---|
| | | ACK | NACK | ACK + SR | NACK + SR |
| SR_1 | SR_2 | A | N | SR_1 | SR_2 |

In some embodiments, a base station configures three resources as SR resources. When an SR is transmitted and HARQ-ACK message is not, SR is transmitted on one of the three resources, where the other two resources of the three resources either correspond to different traffic types, respectively, e.g., eMBB and URLLC traffic, or correspond to different lengths of TTI, e.g., sTTI and TTI, or where the three resources correspond to different traffic types, respectively, e.g., eMBB, mMTC, and URLLC traffic, or correspond to different lengths of TTI, e.g., sTTI_2OS, sTTI_7OS, and TTI. When the SR and the HARQ-ACK need to be transmitted simultaneously but simultaneous transmission is not supported, only the HARQ-ACK information is transmitted and the SR transmission is abandoned. When the SR and the HARQ-ACK message needs to be transmitted simultaneously and simultaneous transmission is supported, transmission is performed within the configured HARQ-ACK and SR resources, where different meanings are represented. When the HARQ-ACK message is 2 bits, four resources are allocated for HARQ-ACK messages to represent {ACK, ACK}, {NACK, ACK}, {ACK, NACK}, and {NACK, NACK}. Here, there are seven resources in total, representing transmitting {ACK, ACK} only, transmitting {NACK, ACK} only, transmitting {ACK, NACK} only, transmitting {NACK, NACK} only, transmitting {ACK, ACK} and SR simultaneously, transmitting {NACK, ACK} and SR simultaneously, transmitting {ACK, NACK} and SR simultaneously. It is about 10% probability that the current SR will be dropped; however, this will not lead to unnecessary retransmission of transport block.

In a further embodiment, a base station configures four resources as SR resources. When a SR is transmitted and a HARQ-ACK message is not, one of the four resources is used to transmit SR, where two other resources of the four resources either correspond to different traffic types, respectively, e.g., eMBB and URLLC traffic, or correspond to different lengths of TTI, e.g., sTTI and TTI, or where three of the four resources correspond to different traffic types, respectively, e.g., eMBB, mMTC, and URLLC, or correspond to different lengths of TTI, e.g., sTTI_2OS, sTTI_7OS, and TTI. When the SR and the HARQ-ACK need to be transmitted simultaneously but simultaneous transmission is not supported, only the HARQ-ACK information is transmitted and the SR transmission is abandoned. When the SR and the HARQ-ACK needs to be transmitted simultaneously and simultaneous transmission is supported, transmission is performed within the configured HARQ-ACK and SR resources, where different meanings are represented. When HARQ-ACK is 2 bits, four resources are allocated for HARQ-ACK to represent {ACK, ACK}, {NACK, ACK}, {ACK, NACK}, and {NACK, NACK}. Here, with the four SR resource, there are eight resources in total, representing transmitting {ACK, ACK} only, transmitting {NACK, ACK} only, transmitting {ACK, NACK} only, transmitting {NACK, NACK} only, transmitting {ACK, ACK} and SR simultaneously, transmitting {NACK, ACK} and SR simultaneously, transmitting {ACK, NACK} and SR simultaneously, and transmitting {NACK, NACK} and SR simultaneously, where it is preferable to use the same resource to transmit SR only and to transmit {NACK, NACK} and SR simultaneously, as shown in Table 7 below.

TABLE 7

| | ACK/NACK only | | | | ACK/NACK + SR | | | |
|---|---|---|---|---|---|---|---|---|
| SR only | 11 | 01 | 10 | 00 | 11 + SR | 01 + SR | 10 + SR | 00 + SR |
| SR_1 | AA | NA | AN | NN | SR_4 | SR_3 | SR_2 | SR_1 |

In some embodiments, a HARQ-ACK message is 2 bits and the simultaneous transmission of ACK/NACK and SR is implemented in a bundling way, where the SR only mode may differentiate different traffic types and transmitting with ACK/NACK simultaneously may also differentiate different traffic types, as shown in Table 8 below. Here, when transmitting ACK/NACK and SR simultaneously, even if detection of a PDCCH is missed (e.g., where the UE believes to message is SR only but the base station believes it to be ACK/NACK+SR), the UE transmits SR_1 and SR_2 which the base station recognizes as NACK, thereby triggering retransmission and remedying the problem of missed PDCCH detection and improving reliability. As the probability of transmitting ACK is higher, preferably, SR_1 is chosen to be cyclic shift (CS)=0, SR_2 to be CS=6, SR_3 to be CS=3, and SR_4 to be CS=9

TABLE 8

| SR only for eMBB | SR only for URLLC | ACK/NACK only | | ACK/NACK + SR | | | |
|---|---|---|---|---|---|---|---|
| | | ACK | NACK | ACK + SR for eMBB | ACK + SR for URLLC | NACK + SR for eMBB | NACK + SR for URLLC |
| SR_1 | SR_2 | A | N | SR_3 | SR_4 | SR _1 | SR_2 |

As described above, in some embodiments, the invention provides uplink information transmission methods that may be used to transmit more effective information with more efficient resource savings when transmitting SR and HARQ-ACK simultaneously. In accordance with various embodiments, such methods avoid allocating excessive sequence resources that leads to decreased multiplexing capacity and thus improves the system resource utilization.

In some embodiments, a sequence-based sPUCCH signal includes up to 2 bits for HARQ-ACK transmission in 2/3-symbol in a shortened TTI (sTTI). In order to address resource overhead concerns, when considering simultaneous transmission of SR and HARQ-ACK message, two alternatives are disclosed in accordance with two embodiments of the invention.

Alternative 1: Configure One PUCCH Resource for SR

For transmission mode (TM) 1\2\6 or TM 3\4\9\10 scheduling by DCI Format 1A in 2-symbol of a sTTI, two PUCCH resources shall be allocated for 1-bit HARQ-ACK transmission. The multiplexing between 1-bit ACK/NACK and SR with only one SR-PUCCH resource is given in Table 9 below.

TABLE 9

|  | ACK/NACK only | | ACK/NACK + SR | |
|---|---|---|---|---|
| SR only | ACK | NACK | ACK + SR | NACK + SR |
| CS_SR | CS_A | CS_N | CS_A or CS_A + CS_SR | CS_SR |

In a sTTI with SR opportunity, a UE uses the allocated SR resource CS_SR to transmit SR if there is only SR transmission in this sTTI. If only 1-bit HARQ-ACK transmission is expected, the UE can utilize the allocated HARQ-ACK resources CS_A and CS_N to transmit ACK and NACK respectively. In case of simultaneous transmission of SR and 1-bit NACK, UE can use SR resource CS_SR for the transmission of NACK and SR. In this case, the discontinuous transmission (DTX) of PDCCH would be regarded as NACK at the eNB side. When SR and 1-bit ACK are to be transmitted in the same sTTI, UE can simply transmit CS_A, while eNB would not be able to distinguish ACK only transmission and SR+ACK transmission. In other words, SR is dropped in this case. Alternatively, the UE can also transmit both CS_A and CS_SR to distinguish this case by causing a higher peak to average power ratio (PAPR).

For TM 3\4\9\10 scheduling not by DCI Format 1A, four PUCCH resources for 2-bit ACK/NACK transmission needs to be configured in 2-symbol sTTI without SR opportunities. However, HARQ-ACK bundling can be used in sTTI with SR opportunity. In this case, two PUCCH resources are configured to HARQ-ACK and the same multiplexing mechanism as Table 9 can be applied.

Alternative 2: Configure two PUCCH resources for SR

As shown in Table 10 below, two PUCCH resources are configured to SR in 2-symbol sTTI. As an enhancement of Alternative 1 described above, the two resources CS_SR1, CS_SR2 can be used to further distinguish between 1-bit ACK+SR transmission and 1-bit NACK+SR transmission.

TABLE 10

|  | ACK/NACK only in sTTI with SR opportunity | | Bundled ACK/NACK + SR | |
|---|---|---|---|---|
| SR only | Bundled ACK | Bundled NACK | Bundled ACK + SR | Bundled NACK + SR |
| CS_SR1 | CS_A | CS_N | CS_SR2 | CS_SR1 |

Based on the alternatives discussed above, the PUCCH resource overhead can be relieved. In accordance with some embodiments, a NR scheduling request protocol, method and system are disclosed. In LTE, scheduling request (SR) is used to request resources for uplink data transmission. A switching on/off mechanism carrying only one state of SR is used. Specifically, when only a positive SR is transmitted, a UE shall use PUCCH Format 1 to transmit on its assigned SR resource, otherwise a UE shall transmit nothing for a negative SR. In some embodiments, the SR-triggered uplink grant-based data transmission design considers applicable reliability and latency requirements, including URLLC, when assessing different design proposals. This implies that the on/off-switching mechanism used in LTE cannot provide enough information for the UL grant in NR.

SR Enhancement for Single Beam

In NR, multiple services with different reliability and latency requirements, e.g. eMBB and URLLC are supported. Different services may use different scheduling numerologies to meet the design metrics. In such case, the SR in NR should distinguish the scheduling for different services. Specifically, the short PUCCH format should be the baseline for HARQ-ACK feedback for URLLC to meet the low latency. That means, if a SR is transmitted in the long PUCCH format, the triggered traffic shall always be eMBB data. But, for the SR transmitted in short PUCCH, one bit SR with two SR configurations should be used to distinguish the scheduling from eMBB and URLLC.

In one embodiment, at least for the SR transmitted in short PUCCH, one bit SR with two SR configurations are used to distinguish the scheduling for eMBB and URLLC. Based on a predetermined sequence selection for up to 2 bits UCI. two or four configured sequences are needed for 1/2-bit UCI. Considering the simultaneous transmission of 1/2-bit ACK/NACK and SR, a UE shall configure 4 sequence resources for SR. Combining with the two SR configurations used to distinguish different services, a total of 8 SR configurations are required. This will cause a large overhead of PUCCH resources. One way to solve this problem is to bundle the 2 bits UCI to reduce the amount of needed PUCCH resources for simultaneous transmission of 2 bits ACK/NACK and SR. Then 4 SR configurations are needed. Table 11 below shows an example for the multiplexing between SR and 2-bit ACK/NACK within a short PUCCH with SR opportunity, in accordance with one embodiment. The four SR configurations are defined as CS SR1, CS SR2, CS SR3 and CS SR4 respectively. For the simultaneous transmission of Bundled ACK/NACK and SR, the SR configuration used for bundled NACK is the same as the configuration for SR only transmission. That is to avoid possible ambiguity when PDCCH is missed. In some embodiments, a one bit SR with four SR configurations is defined for SR transmission in short PUCCH based on sequence selection.

TABLE 11

| | ACK/NACK only in sTTI | | Bundled ACK/NACK + SR | | | |
|---|---|---|---|---|---|---|
| | with SR opportunity | | Bundled | Bundled | Bundled | Bundled |
| SR only | Bundled ACK | Bundled NACK | ACK + SR for eMBB | NACK + SR for eMBB | ACK + SR for URLLC | NACK + SR for URLLC |
| CS_SR2 for eMBB CS_SR4 for URLLC | CS_A | CS_N | CS_SR1 | CS_SR2 | CS_SR3 | CS_SR4 |

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations.

Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, etc. that is physically constructed, programmed and/or arranged to perform the specified operation or function.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method performed by a first communication node, comprising:
configuring four resources as four scheduling request (SR) resources for transmitting a scheduling request from a second communication node to the first communication node, wherein:
a first resource of the four resources is selectively allocated when only the scheduling request is transmitted without transmission of any hybrid automatic repeat request acknowledgement (HARQ-ACK) message,
the first resource of the four resources is also allocated when both the scheduling request and a HARQ-ACK message comprising two bits {NACK, NACK} are transmitted simultaneously,
NACK represents negative acknowledgement,
each of the other three of the four resources is allocated when both the scheduling request and a respective one of two-bit HARQ-ACK messages {ACK, ACK}, {NACK, ACK}, {ACK, NACK} are transmitted simultaneously,
ACK represents acknowledgement, and
the four resources comprise two resources allocated for transmitting the scheduling request for first and second traffic types, respectively.

2. The method of claim 1, wherein:
three of the four resources correspond to three different traffic types, respectively.

3. The method of claim 1, wherein:
three of the four resources correspond to three different lengths of transmission time interval, respectively.

4. The method of claim 1, wherein:
a first one of the two resources is allocated for transmitting only the scheduling request for the first traffic type,
the first one of the two resources is also allocated for simultaneously transmitting the scheduling request for the first traffic type and a respective negative acknowledgement (NACK),
a second one of the two resources is allocated for transmitting only the scheduling request for the second traffic type that is different from the first traffic type, and
the second one of the two resources is also allocated for simultaneously transmitting the scheduling request for the second traffic type and a respective NACK.

5. The method of claim 1, wherein:
a first one of the two resources is allocated for simultaneously transmitting the scheduling request for the first traffic type and a respective acknowledgement (ACK),
a second one of the two resources is allocated for simultaneously transmitting the scheduling request for the second traffic type and a respective NACK.

6. A method performed by a second communication node, comprising:
transmitting a scheduling request from the second communication node to a first communication node using one of four resources configured as four scheduling request (SR) resources by the first communication node, wherein:
a first resource of the four resources is selectively allocated when only the scheduling request is transmitted without transmission of hybrid automatic repeat request acknowledgement (HARQ-ACK) message,
the first resource of the four resources is also allocated when both the scheduling request and a HARQ-ACK message comprising two bits {NACK, NACK} are transmitted simultaneously,
NACK represents negative acknowledgement,
each of the other three of the four resources is allocated when both the scheduling request and a respective one of two-bit HARQ-ACK messages {ACK, ACK}, {NACK, ACK}, {ACK, NACK} are transmitted simultaneously,
ACK represents acknowledgement, and
the four resources comprise two resources allocated for transmitting the scheduling request for first and second traffic types, respectively.

7. The method of claim 6, wherein:
three of the four resources correspond to three different traffic types, respectively.

8. The method of claim 6, wherein:
three of the four resources correspond to three different lengths of transmission time interval, respectively.

9. A first communication node, comprising:
at least one processor configured for configuring four resources as four scheduling request (SR) resources for transmitting a scheduling request from a second communication node to the first communication node, wherein:
a first resource of the four resources is selectively allocated when only the scheduling request is transmitted without transmission of any h hybrid automatic repeat request acknowledgement (HARQ-ACK) message,
the first resource of the four resources is also allocated when both the scheduling request and a HARQ-ACK message comprising two bits {NACK, NACK} are transmitted simultaneously,
NACK represents negative acknowledgement,
each of the other three of the four resources is allocated when both the scheduling request and a respective one of two-bit HARQ-ACK messages {ACK, ACK}, {NACK, ACK}, {ACK, NACK} are transmitted simultaneously, ACK represents acknowledgement, and the four resources comprise two resources allocated for transmitting the scheduling request for first and second traffic types, respectively.

10. The first communication node of claim 9, wherein:
three of the four resources correspond to three different traffic types, respectively.

11. The first communication node of claim 9, wherein:
three of the four resources correspond to three different lengths of transmission time interval, respectively.

12. A second communication node, comprising:

a transceiver configured for transmitting a scheduling request to a first communication node using one of four resources configured as four scheduling request (SR) resources by the first communication node, wherein:

a first resource of the four resources is selectively allocated when only the scheduling request is transmitted without transmission of hybrid automatic repeat request acknowledgement (HARQ-ACK) message, the first resource of the four resources is also allocated when both the scheduling request and a HARQ-ACK message comprising two bits {NACK, NACK} are transmitted simultaneously, NACK represents negative acknowledgement, each of the other three of the four resources is allocated when both the scheduling request and a respective one of two-bit HARQ-ACK messages {ACK, ACK}, {NACK, ACK}, {ACK, NACK} are transmitted simultaneously, ACK represents acknowledgement, and the four resources comprise two resources allocated for transmitting the scheduling request for first and second traffic types, respectively.

13. The second communication node of claim 12, wherein:
three of the four resources correspond to three different traffic types, respectively.

14. The second communication node of claim 12, wherein:
three of the four resources correspond to three different lengths of transmission time interval, respectively.

15. A non-transitory computer-readable medium having computer-executable instructions stored thereon, the computer-executable instructions, when executed by a processor of a first communication node, causing the processor to perform:

configuring four resources as four scheduling request (SR) resources for transmitting a scheduling request from a second communication node to the first communication node, wherein:

a first resource of the four resources is selectively allocated when only the scheduling request is transmitted without transmission of any hybrid automatic repeat request acknowledgement (HARQ-ACK) message, the first resource of the four resources is also allocated when both the scheduling request and a HARQ-ACK message comprising two bits {NACK, NACK} are transmitted simultaneously, NACK represents negative acknowledgement, each of the other three of the four resources is allocated when both the scheduling request and a respective one of two-bit HARQ-ACK messages {ACK, ACK}, {NACK, ACK}, {ACK, NACK} are transmitted simultaneously, ACK represents acknowledgement, and the four resources comprise two resources allocated for transmitting the scheduling request for first and second traffic types, respectively.

* * * * *